United States Patent
Kim

(10) Patent No.: US 10,780,785 B2
(45) Date of Patent: Sep. 22, 2020

(54) BRAKING FORCE CONTROL SYSTEM FOR A VEHICLE

(71) Applicants: HYUNDAI MOTOR COMPANY, Seoul (KR); KIA MOTORS CORPORATION, Seoul (KR)

(72) Inventor: In Su Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/290,265

(22) Filed: Mar. 1, 2019

(65) Prior Publication Data

US 2020/0156478 A1    May 21, 2020

(30) Foreign Application Priority Data

Nov. 16, 2018   (KR) ........................ 10-2018-0141643

(51) Int. Cl.
    *B60L 7/18*          (2006.01)
    *B60T 13/74*       (2006.01)
    *B60G 17/016*     (2006.01)

(52) U.S. Cl.
    CPC ............ *B60L 7/18* (2013.01); *B60G 17/0164* (2013.01); *B60T 13/745* (2013.01); *B60G 2600/07* (2013.01); *B60G 2600/18* (2013.01); *B60Y 2200/91* (2013.01); *B60Y 2200/92* (2013.01); *B60Y 2400/81* (2013.01)

(58) Field of Classification Search
    CPC . B60L 7/26; B60L 7/18; B60T 13/741; B60T 13/745; B60T 8/176
    See application file for complete search history.

(56) References Cited

U.S. PATENT DOCUMENTS

| | | | | |
|---|---|---|---|---|
| 8,392,030 B2* | 3/2013 | Anderson | ............... | B60L 7/003 700/286 |
| 9,527,388 B2* | 12/2016 | Saito | ......................... | B60L 7/18 |
| 9,895,978 B2* | 2/2018 | Suda | ......................... | B60T 1/10 |
| 9,914,438 B2* | 3/2018 | Nishikawa | ................ | B60T 1/10 |
| 9,981,542 B2* | 5/2018 | Oguri | .................... | B60W 10/08 |
| 10,046,643 B2* | 8/2018 | Nakatsu | ............. | B60T 8/17616 |
| 10,189,454 B2* | 1/2019 | Yamamoto | ............ | B60T 13/586 |
| 2012/0074768 A1* | 3/2012 | Naito | ........................ | B60T 1/10 303/3 |
| 2012/0185136 A1* | 7/2012 | Ohnuma | ............ | B60G 17/0195 701/48 |
| 2019/0001782 A1* | 1/2019 | Anderson | ............ | B60G 17/019 |
| 2020/0017163 A1* | 1/2020 | Shahana | ................... | B62L 1/00 |

FOREIGN PATENT DOCUMENTS

KR      1020050077052      8/2005

* cited by examiner

*Primary Examiner* — Thai T Dinh
(74) *Attorney, Agent, or Firm* — Lempia Summerfield Katz LLC

(57) ABSTRACT

In a braking force control system for a vehicle, braking is performed by distributing a braking force required for braking the vehicle to the regenerative braking force and the friction braking force. The regenerative braking force and the friction braking force are re-distributed by predicting a nose dive phenomenon of the vehicle, whereby the occurrence of the nose dive phenomenon is prevented by minimizing damping control of an electronic control suspension (ECS). Thus, an excessive operation of the ECS may be prevented.

9 Claims, 2 Drawing Sheets

BRAKING FORCE CONTROL SYSTEM FOR A VEHICLE

CROSS REFERENCE TO RELATED APPLICATION

The present application claims priority to Korean Patent Application No. 10-2018-0141643, filed Nov. 16, 2018, the entire contents of which is incorporated herein for all purposes by this reference.

BACKGROUND

1. Technical Field

The present disclosure relates to a braking force control system for a vehicle. More particularly, the disclosure relates to a braking force control system for a vehicle, which performs braking by distributing a regenerative braking force and a frictional braking force and prevents a nose dive phenomenon in an electric vehicle or a hybrid vehicle.

2. Description of the Related Art

Electronic control suspension (ECS) system is a system in which situations, such as a driving condition of a vehicle, a state of a road surface, driver's selection switches, and the like, sensed by various sensors installed at parts of a vehicle are aggregated. An electronic control unit (ECU) controls an actuator to automatically adjust a height of vehicle, a spring constant of a suspension, and a damping force to enhance riding comfort during driving and improve steering performance and safety.

In order to prevent the nose dive phenomenon of the vehicle that is caused as the weight of the vehicle is transferred to front wheels of the vehicle when the vehicle is suddenly braked, the related art ECS performs control to increase a damping force of a damper of a suspension without distinguishing between an eco-friendly vehicle (e.g., hybrid, fuel cell, and/or electric vehicles) or a fossil fuel vehicle.

In addition, regenerative braking based on regenerative power generation is performed in addition to friction braking in an eco-friendly vehicle. The eco-friendly vehicle employing such a regenerative braking system preferentially distributes a required braking force of a driver as a regenerative driving force when the vehicle is braked to enhance fuel efficiency. However, when a motor device is provided at front wheels of the eco-friendly vehicle, the weight of the vehicle concentrates on the front wheels, thereby causing the nose dive phenomenon to occur more frequently as compared with a fossil fuel vehicle in which a braking force is simultaneously applied to both the front wheels and the rear wheels.

The foregoing is intended merely to aid in the understanding of the background of the present disclosure and is not intended to mean that the present disclosure falls within the purview of the related art that is already known to those having ordinary skill in the art.

The contents described as the related art have been provided only to assist in understanding the background of the present disclosure and should not be considered as corresponding to the related art known to those having ordinary skill in the art.

SUMMARY

An object of the present disclosure is to provide a braking force control system for a vehicle, which performs braking by distributing a braking force required when the vehicle is braked as a regenerative braking force and a friction braking force and re-distributes the regenerative braking force and the friction braking force by predicting a nose dive phenomenon of the vehicle, thereby minimizing electric control suspension (ECS) damping control to prevent the occurrence of the nose dive phenomenon.

According to an embodiment of the present disclosure, a braking force control system for a vehicle includes: a braking system configured to apply a friction braking force by a friction braking device and a regenerative braking force by a motor; a braking force calculating unit configured to derive a required braking force as a brake pedal is stepped; and a braking force distributing unit configured to compare, when the required braking force is input, the required braking force with the regenerative braking force and configured to distribute a braking force. The braking force is distributed such that braking is performed with the regenerative braking force if the required braking force is lower than the regenerative braking force and such that braking is performed with the regenerative braking force and the friction braking force if the required braking force is higher than the regenerative braking force. The braking force control system also includes a nose dive determining unit configured to determine whether a nose dive phenomenon occurs at the time of braking and transfer a nose dive signal to the braking force distributing unit when the nose dive phenomenon occurs. The braking system may include a front wheel friction braking device provided at a front wheel to apply a front wheel friction braking force to the front wheel and a rear wheel friction braking device provided at a rear wheel to apply a rear wheel friction braking force to the rear wheel. The motor is connected to the front wheel or the rear wheel and may be driven or perform regenerative generation to apply the regenerative braking force to the front wheel or the rear wheel. When the nose dive signal is input in a state in which the required braking force is lower than the regenerative braking force, the braking force distributing unit may distribute a braking force such that the regenerative braking force is reduced and the vehicle is braked by the rear wheel friction braking force.

In the braking system, the motor may be connected to the front wheel.

When the required braking force is higher than the regenerative braking force, the braking force distributing unit may brake the vehicle with the regenerative braking force and the rear wheel friction braking force.

When the nose dive signal is input in a state in which the required braking force is lower than the regenerative braking force and the rear wheel friction braking force, the braking force distributing unit may distribute the braking force such that the regenerative braking force is reduced and the rear wheel friction braking force is increased.

When the nose dive signal is input in a state in which the regenerative braking force is reduced and the rear wheel friction braking force is increased through the braking force distributing unit, an electronic control suspension (ECS) system may perform control to increase a damping force.

When the required braking force is higher than the regenerative braking force and the rear wheel friction braking force, the braking force distributing unit may distribute the braking force such that the vehicle is braked by the regenerative braking force, the front wheel friction braking force, and the rear wheel friction braking force.

When the nose dive signal is input in a state in which the required braking force is higher than the regenerative braking force and the rear wheel friction braking force, the braking force distributing unit may reduce the regenerative braking force and the front wheel friction braking force and increase the rear wheel friction braking force.

When the nose dive signal is input in a state in which the regenerative braking force and the front wheel friction braking force are reduced and the rear wheel friction braking force is increased through the braking force distributing unit, an ECS may perform control to increase a damping force.

The braking force control system may further include a sensing device configured to sense an obstacle around the vehicle, where, when the nose dive signal is input in a state in which an obstacle is sensed in a traveling direction through the sensing device, an ECS may perform control to reduce a damping force.

DETAILED DESCRIPTION OF THE EMBODIMENTS

Hereinafter, a braking force control system for a vehicle according to embodiments of the present disclosure is described with reference to the accompanying drawings.

Figure 1:
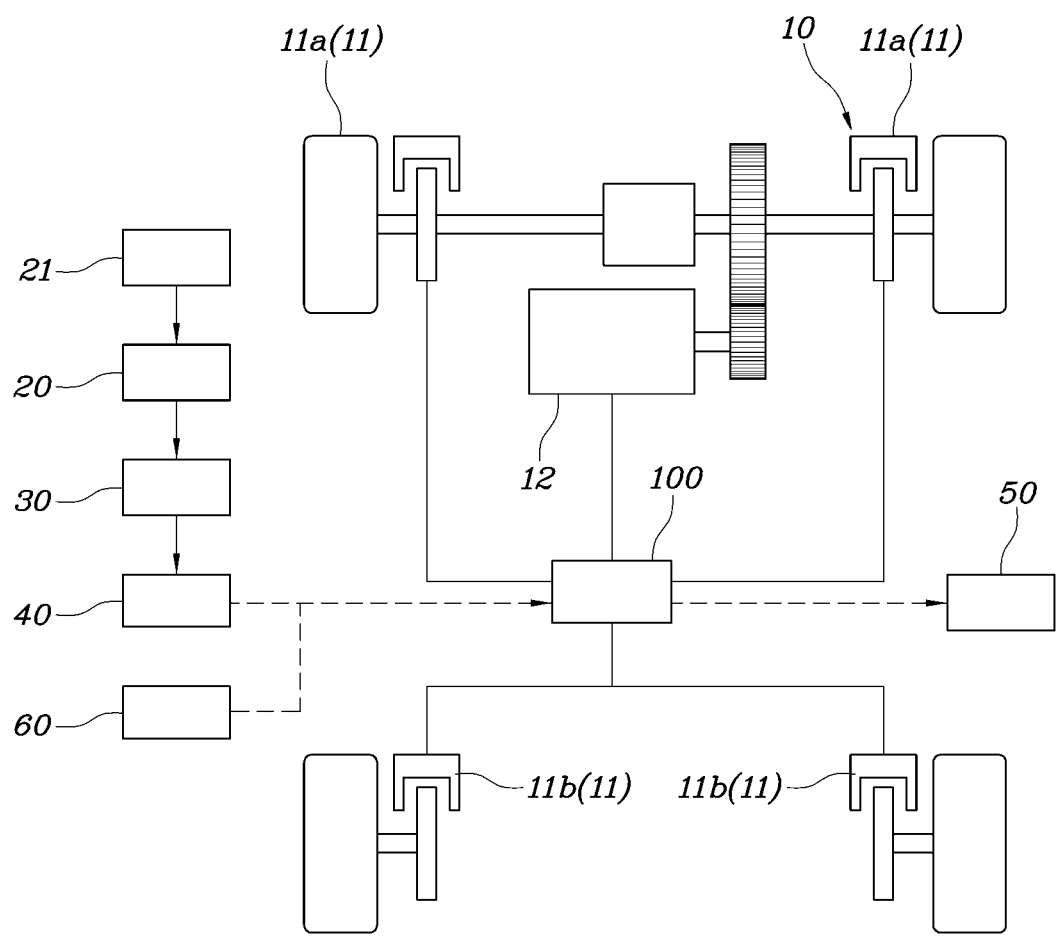
FIG. 1 is a view illustrating a configuration of a braking force control system for a vehicle according to the present disclosure.
Figure 2:
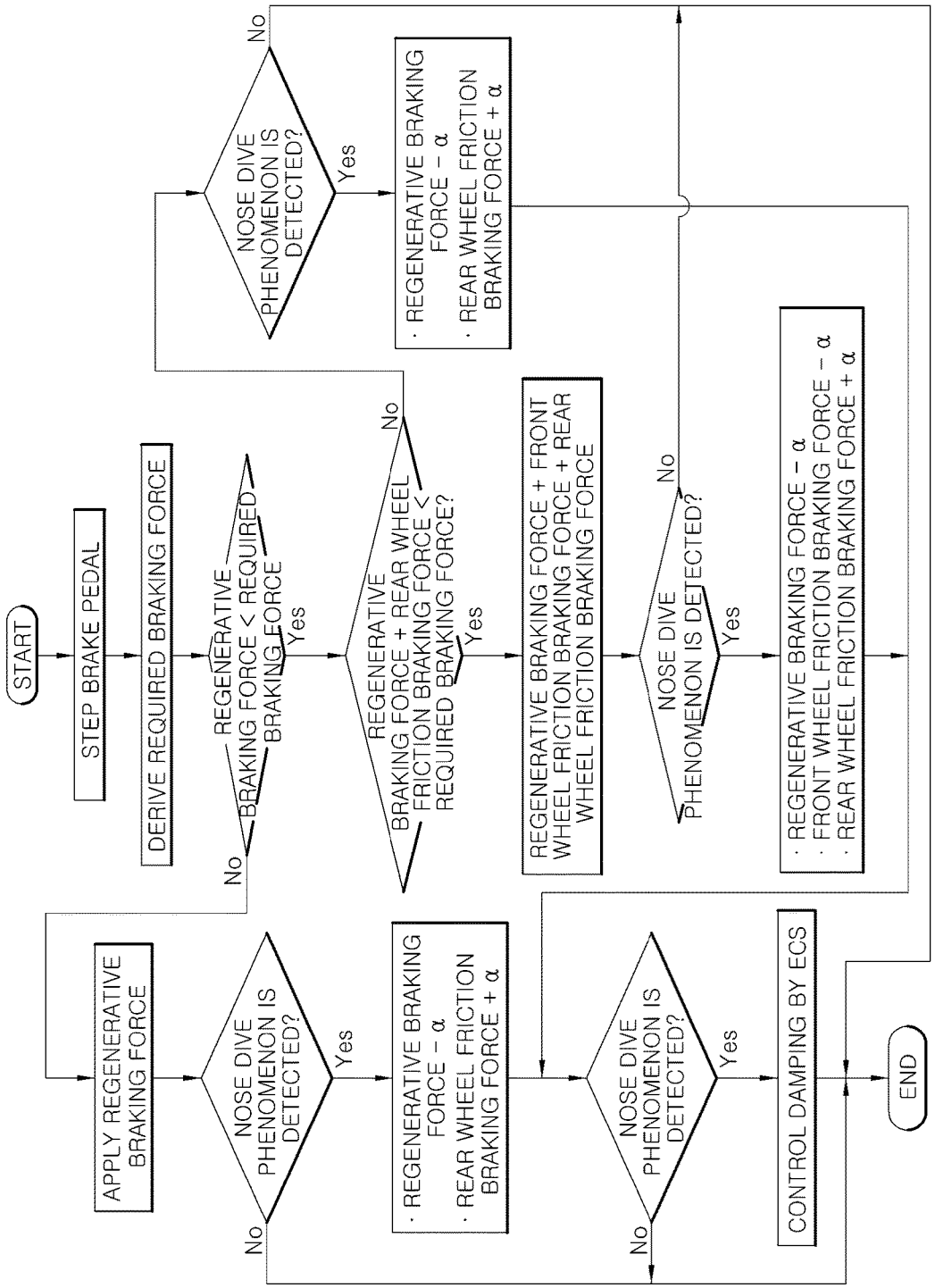
FIG. 2 is a flowchart illustrating a process of controlling a braking force of the vehicle illustrated in FIG. 1.

FIG. 1 is a view illustrating a configuration of a braking force control system for a vehicle according to the present disclosure. FIG. 2 is a flowchart illustrating a process of controlling a braking force of the vehicle illustrated in FIG. 1.

As illustrated in FIGS. 1 and 2, the braking force control system for a vehicle according to the present disclosure includes a braking system 10 applying a friction braking force by a friction braking device 11 and applying a regenerative braking force by a motor 12. The braking force control system also includes a braking force calculating unit 20 deriving a required braking force as the brake pedal 21 is pressed or stepped on. The braking force control system also includes a braking force distributing unit 30 comparing, when the required braking force is input, the required braking force with the regenerative braking force, and distributing a braking force such that braking is performed with the regenerative braking force if the required braking force is lower than the regenerative braking force and such that braking is performed with the regenerative braking force and a friction braking force if the required braking force is higher than the regenerative braking force.

In this manner, the braking force control system for the vehicle according to the present disclosure includes the braking system 10, the braking force calculating unit 20, and the braking force distributing unit 30. The braking system 10 includes a friction braking device 11, which is configured as a braking device, and a motor 12. The friction braking device 11 is configured to generate a friction braking force based on an operation of a disk and a caliper of the braking device. The motor 12 is configured to generate a regenerative braking force at the time of regenerative braking.

The braking force calculating unit 20 derives the required braking force as the brake pedal 21 is stepped. The required braking force is in proportion to a stepping force by which the driver presses the brake pedal 21. The braking force calculating unit 20 may derive the required braking force by sensing stepping on the brake pedal 21.

The braking force distributing unit 30 receives the required braking force from the braking force calculating unit 20 and distributes the braking force such that braking is performed with the regenerative braking force if the required braking force is lower than the regenerative braking force and braking is performed with the regenerative braking force and the friction braking force if the required braking force is higher than the regenerative braking force. The regenerative braking force may be derived from the amount of electricity generated at the time of regenerative braking, a frictional force, and a motor driving state.

That is, the vehicle is preferentially braked with the regenerative braking force. If the required braking force is lower than the regenerative braking force, braking is performed only with the regenerative braking force. If the required braking force is higher than the regenerative braking force, friction braking force is additionally applied so that braking is performed with the regenerative braking force and the friction braking force. Therefore, when the required braking force is generated as the driver operates the brake pedal 21, energy generation is performed based on the regenerative braking force. The regenerative braking force and the friction braking force are appropriately distributed according to the magnitude of the required braking force to generate a braking force corresponding to the required braking force, thereby performing braking desired by the driver. The braking force distributed and determined by the braking force distributing unit 30 may be input to a controller 100 that controls the friction braking device 11 or the motor 12 so that the vehicle may be braked with the braking force determined by the braking force distributing unit 30.

In detail, as illustrated in FIG. 1, the braking system 10 includes a front wheel friction braking device 11a provided at a front wheel to apply a front wheel friction braking force to the front wheel and a rear wheel friction braking device 11b provided at a rear wheel to apply a friction braking force to the rear wheel. The motor 12 is connected to the front wheel or the rear wheel and is driven or performs regenerative generation to apply a regenerative braking force to the front wheel or the rear wheel. In the braking system 10, the motor 12 may be connected to the front wheel.

In this manner, in the braking system 10, the front wheel friction braking device 11a and the rear wheel friction braking device 11b are provided to apply the front wheel friction braking force and the rear wheel friction braking force, respectively. The motor 12 is connected to the front wheel for applying a regenerative braking force to the front wheel according to driving of the vehicle or regenerative power generation based on rotation of the front wheel. Therefore, through distribution of the front wheel friction braking force, the rear wheel friction braking force, and the regenerative braking force of the front wheel side, the braking force is generated in accordance with the required braking force as the brake pedal 21 is stepped on and a nose dive phenomenon is prevented.

In detail, the braking force control system for a vehicle according to the present disclosure may further include a nose dive determining unit 40 for determining whether a nose dive phenomenon occurs at the time of braking and transmitting, when the nose dive phenomenon occurs, a corresponding nose dive signal to the braking force distributing unit 30. The nose dive determining unit 40 may receive a tilt of a vehicle body from a six-axis sensor applied to the vehicle or receive a required braking force, determine a tilt of the vehicle body due to the occurrence of a sudden stop, and estimate whether a nose dive phenomenon has occurred.

When the nose dive signal is input in a state in which the required braking force is lower than the regenerative braking force, the braking force distributing unit 30 may reduce the regenerative braking force and distribute the braking force so that the vehicle may be braked by the rear wheel friction braking force.

As described above, when the required braking force is lower than the regenerative braking force, the braking force distributing unit 30 causes the vehicle to be braked only by the regenerative braking force. When the nose dive signal is input through the nose dive determining unit 40, the braking force distributing unit 30 distributes the braking force so that the regenerative braking force is reduced and the vehicle is braked by the rear wheel friction braking force.

That is, since the regenerative braking force is generated at the front wheel, the regenerative braking force is reduced, thereby reducing forward tilting of the vehicle body based on the braking force generated at the front wheel. In addition, as the rear wheel friction braking force is generated, a braking force is generated at the rear wheel side. Accordingly, a force acting on the vehicle body is increased on the rear wheel side to cause the vehicle body to be inclined backwards. Thus, the nose dive phenomenon in which the front portion of the vehicle body is dived by inertia is suppressed, thereby causing the vehicle to stably behave.

When the required braking force is higher than the regenerative braking force, the braking force distributing unit 30 may cause the vehicle to be braked by the regenerative braking force and the rear wheel friction braking force.

Thus, when the required braking force is higher than the regenerative braking force, the braking force distributing unit 30 applies the regenerative braking force and the rear wheel friction braking force, whereby energy generation based on the regenerative braking force is maintained and the rear wheel friction braking force is added in performing braking. Accordingly, the vehicle may be braked with the required braking force desired by the driver.

When the nose dive signal is input in a state in which the required braking force is lower than the regenerative braking force and the rear wheel friction braking force, the braking force distributing unit 30 may distribute the braking force such that the regenerative braking force is reduced and the rear wheel friction braking force is increased.

When a nose dive detection signal is input through the nose dive determining unit 40, the braking force distributing unit 30 reduces the regenerative braking force so that tilting of the vehicle body toward the front by the braking force generated at the front wheel is reduced and increases the rear wheel friction braking force so that tilting of the vehicle body toward the rear is generated by the braking force generated from the rear wheel. As a result, the nose dive phenomenon in which the front portion of the vehicle body is dived by inertia is suppressed.

In a state in which the regenerative braking force is reduced through the braking force distributing unit 30 and the rear wheel friction braking force is increased, an electronic control suspension (ECS) system 50 may perform control to increase a damping force when the nose dive signal is input. That is, the nose dive phenomenon is suppressed by the front wheel friction braking force, the rear wheel friction braking force, and the regenerative braking force. If the nose dive detection signal is continuously input even under the distribution of the braking force, the nose dive phenomenon is prevented under the control of the ECS 50. In this manner, the operation of the ECS 50 is minimized by suppressing the nose dive phenomenon by the front wheel friction braking force, the rear wheel friction braking force, and the regenerative braking force. However, if the nose dive phenomenon is detected even by the distribution of the front wheel friction braking force, the rear wheel friction braking force, and the regenerative braking force, the ECS 50 may control damping to prevent the nose dive phenomenon. The ECS 50 may control damping such that a damping force of the front wheel is increased and a damping force of the rear wheel is decreased to prevent the nose dive phenomenon.

The damping control by the ECS 50 may be performed through an electronically controlled hydraulic braking device, which brakes the vehicle by regulating a hydraulic pressure transferred from a master cylinder to each wheel cylinder. Regulation of the damping force through the ECS 50 is known by one of ordinary skill in the art. Thus, a detailed description thereof is omitted.

When the required braking force is higher than the regenerative braking force and the rear wheel friction braking force, the braking force distributing unit 30 may distribute the braking force such that the vehicle may be braked by the regenerative braking force, the front friction braking force, and the rear wheel friction braking force.

When the required braking force is higher than the regenerative braking force and the rear wheel braking force, the braking force distributing unit 30 additionally applies the front wheel friction braking force together with the regenerative braking force and the rear wheel friction braking force, whereby energy generation by the regenerative braking force is reduced. Since the vehicle is braked by the front wheel friction braking force and the rear wheel friction braking force, the vehicle may be braked with the required braking force desired by the driver.

When the nose dive signal is input in a state in which the required braking force is higher than the regenerative braking force and the rear wheel friction braking force, the braking force distributing unit 30 reduces the regenerative braking force and the front wheel friction braking force and increases the rear wheel friction braking force.

That is, when the nose dive detection signal is input through the nose dive determining unit 40, the braking force distributing unit 30 reduces the regenerative braking force and the front wheel friction braking force so that tilting of the vehicle body to the front by the braking force generated at the front wheel may be reduced and increases the rear wheel friction braking force so that the vehicle body may tilt to the rear by the braking force generated at the rear wheel. As a result, the nose dive phenomenon in which the front portion of the vehicle body is dived by inertia is suppressed.

If the nose dive signal is input in a state in which the regenerative braking force and the front friction braking force are reduced and the rear wheel friction braking force is increased through the braking force distributing unit 30, the ECS 50 may perform control to increase a damping force.

In this manner, if a nose dive phenomenon detection signal is input when braking is performed by the front wheel friction braking force, the rear wheel friction braking force, and the regenerative braking force, the ECS 50 controls damping such that a damping force of the front wheel is increased and a damping force of the rear wheel is reduced, thereby preventing the nose dive phenomenon. Since the ECS 50 finally operates after the distribution of the braking force to perform damping control, the operation of the ECS 50 may be minimized and the nose dive phenomenon may be prevented.

The braking force control system for a vehicle may further include a sensing device 60 configured to sense an obstacle near the vehicle. When the nose dive signal is input in a state in which an obstacle is sensed in a traveling direction through the sensing device 60, the ECS 50 may perform control to reduce a damping force.

The sensing device 60 may include a radar sensor, a camera, and the like. When an obstacle is sensed in a traveling direction of the vehicle through the sensing device 60, the ECS 50 may reduce the damping force so that shock absorption may be performed smoothly when the vehicle passes through the obstacle, such as an uneven surface. That is, although the nose dive signal is input, the ECS 50 reduces the damping force so that a shock transmitted to the driver may be sufficiently absorbed by the damper action, thereby reducing the shock to the driver.

As described above, in the braking force control system for a vehicle having the above-described structure, braking is performed by distributing a braking force required for braking the vehicle to the regenerative braking force and the friction braking force. The regenerative braking force and the friction braking force are re-distributed by predicting a nose dive phenomenon of the vehicle, whereby the occurrence of the nose dive phenomenon is prevented by minimizing damping control of the ECS. Thus, an excessive operation of the ECS may be prevented.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A braking force control system for a vehicle, the braking force control system comprising:
    a braking system configured to apply a friction braking force by a friction braking device and a regenerative braking force by a motor;
    a braking force calculating unit configured to derive a required braking force as a brake pedal is stepped on;
    a braking force distributing unit configured to compare, when the required braking force is input, the required braking force with the regenerative braking force and configured to distribute a braking force such that braking is performed with the regenerative braking force if the required braking force is lower than the regenerative braking force and such that braking is performed with the regenerative braking force and the friction braking force if the required braking force is higher than the regenerative braking force;
    a nose dive determining unit configured to determine whether a nose dive phenomenon occurs when the braking is performed and configured to transfer a nose dive signal to the braking force distributing unit when the nose dive phenomenon occurs,
    wherein the braking system includes a front wheel friction braking device provided at a front wheel to apply a front wheel friction braking force to the front wheel and a rear wheel friction braking device provided at a rear wheel to apply a rear wheel friction braking force to the rear wheel,
    wherein the motor is connected to the front wheel or the rear wheel and is driven or performs regenerative generation to apply the regenerative braking force to the front wheel or the rear wheel, and
    wherein, when the nose dive signal is input in a state in which the required braking force is lower than the regenerative braking force, the braking force distributing unit distributes the braking force such that the regenerative braking force is reduced and the vehicle is braked by the rear wheel friction braking force.

2. The braking force control system of claim 1, wherein the motor is connected to the front wheel.

3. The braking force control system of claim 1, wherein when the required braking force is higher than the regenerative braking force, the braking force distributing unit brakes the vehicle with the regenerative braking force and the rear wheel friction braking force.

4. The braking force control system of claim 3, wherein when the nose dive signal is input in a state in which the required braking force is lower than the regenerative braking force and the rear wheel friction braking force, the braking force distributing unit distributes the braking force such that the regenerative braking force is reduced and the rear wheel friction braking force is increased.

5. The braking force control system of claim 4, wherein when the nose dive signal is input in a state in which the regenerative braking force is reduced and the rear wheel friction braking force is increased through the braking force distributing unit, an electronic control suspension (ECS) system increases a damping force.

6. The braking force control system of claim 3, wherein when the required braking force is higher than the regenerative braking force and the rear wheel friction braking force, the braking force distributing unit distributes the braking force such that the vehicle is braked by the regenerative braking force, the front wheel friction braking force, and the rear wheel friction braking force.

7. The braking force control system of claim 6, wherein when the nose dive signal is input in a state in which the required braking force is higher than the regenerative braking force and the rear wheel friction braking force, the braking force distributing unit reduces the regenerative braking force and the front wheel friction braking force and increases the rear wheel friction braking force.

8. The braking force control system of claim 7, wherein when the nose dive signal is input in a state in which the regenerative braking force and the front wheel friction braking force are reduced and the rear wheel friction braking force is increased through the braking force distributing unit, an electronic control suspension (ECS) increases a damping force.

9. The braking force control system of claim 1, further comprising:
    a sensing device sensing an obstacle near the vehicle,
    wherein when the nose dive signal is input in a state in which the obstacle is sensed in a traveling direction through the sensing device, an electronic control suspension (ECSC reduces a damping force.

* * * * *

UNITED STATES PATENT AND TRADEMARK OFFICE
CERTIFICATE OF CORRECTION

PATENT NO. : 10,780,785 B2  
APPLICATION NO. : 16/290265  
DATED : September 22, 2020  
INVENTOR(S) : In Su Kim Page 1 of 1

It is certified that error appears in the above-identified patent and that said Letters Patent is hereby corrected as shown below:

In the Claims

Claim 9, Column 8, last line: "(ECSC" should be replaced with --(ECS)--

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*